(12) United States Patent
Yada et al.

(10) Patent No.: US 11,993,345 B2
(45) Date of Patent: May 28, 2024

(54) DRIVE DISKS (71) Applicants: HONDA MOTOR CO., LTD., Tokyo (JP); NIDEC-SHIMPO CORPORATION, Nagaokakyo (JP)

(72) Inventors: Wataru Yada, Saitama (JP); Hiroshi Gomi, Saitama (JP); Norio Deguchi, Kyoto (JP)

(73) Assignees: HONDA MOTOR CO., LTD., Tokyo (JP); NIDEC-SHIMPO CORPORATION, Kyoto (JP)

( * ) Notice: Subject to any disclaimer, the term of this patent is extended or adjusted under 35 U.S.C. 154(b) by 596 days.

(21) Appl. No.: 17/333,194

(22) Filed: May 28, 2021

(65) Prior Publication Data
US 2021/0379929 A1 Dec. 9, 2021

(30) Foreign Application Priority Data
Jun. 5, 2020 (JP) .................................. 2020-098235

(51) Int. Cl.
*B62M 6/75* (2010.01)
*B62K 1/00* (2006.01)
(Continued)

(52) U.S. Cl.
CPC ................. *B62M 6/75* (2013.01); *B62K 1/00* (2013.01); *B62K 11/007* (2016.11); *B60B 19/003* (2013.01); *B60B 19/12* (2013.01)

(58) Field of Classification Search
CPC .......... B62M 6/75; B62K 1/00; B62K 11/007; B60B 19/003; B60B 19/12
See application file for complete search history.

(56) References Cited

U.S. PATENT DOCUMENTS 8,386,159 B2 * 2/2013 Takenaka ............. B62K 11/007
  180/21
8,408,339 B2 * 4/2013 Makino ................... B60B 3/048
  180/21
(Continued)

FOREIGN PATENT DOCUMENTS

DE 102014223107 A1 5/2015
JP 2011063214 A 3/2011
(Continued)

OTHER PUBLICATIONS

Search Report for German Patent Application No. DE102021114276.8 issued on Nov. 16, 2022; 11 pp.

*Primary Examiner* — Jacob B Meyer
(74) *Attorney, Agent, or Firm* — Armstrong Teasdale LLP (57) ABSTRACT

Drive disks are configured to rotate a main wheel by applying a frictional force thereto. Each of the drive disks includes a base and a plurality of rollers. The base includes a first sheet metal member and a second sheet metal member. The first sheet metal member includes a first central part and a plurality of first arm parts. The second sheet metal member includes a second central part and a plurality of second arm parts. Each of the rollers has a first end and a second end. Each of the first arm parts includes a first supporting part and a second supporting part. Each of the second arm parts includes a third supporting part and a fourth supporting part. The first supporting part and the second supporting part are inclined to each other. The third supporting part and the fourth supporting part are inclined to each other.

5 Claims, 8 Drawing Sheets (51) Int. Cl.
  *B62K 11/00* (2006.01)
  *B60B 19/00* (2006.01)
  *B60B 19/12* (2006.01)

(56) References Cited

U.S. PATENT DOCUMENTS

| | | | | |
|---|---|---|---|---|
| 8,443,920 | B2* | 5/2013 | Gomi | B62J 25/04 180/21 |
| 8,513,917 | B2* | 8/2013 | Gomi | B62J 1/005 320/109 |
| 8,522,902 | B2* | 9/2013 | Gomi | B62K 11/007 180/21 |
| 9,139,224 | B2* | 9/2015 | Araki | B62K 1/00 |
| 9,457,861 | B2* | 10/2016 | Araki | B62H 1/12 |
| 2011/0070997 | A1* | 3/2011 | Gomi | B60B 9/10 476/66 |
| 2011/0070998 | A1* | 3/2011 | Takenaka | B60B 19/003 476/68 |
| 2012/0172169 | A1* | 7/2012 | Gomi | B62K 15/00 475/197 |
| 2013/0299260 | A1* | 11/2013 | Shimizu | B62H 1/12 180/220 |
| 2013/0299263 | A1* | 11/2013 | Shimizu | B62K 11/007 180/220 |
| 2014/0353051 | A1* | 12/2014 | Yada | B62K 1/00 180/6.2 |
| 2014/0353052 | A1* | 12/2014 | Muto | B62K 1/00 180/6.5 |
| 2014/0353941 | A1* | 12/2014 | Muto | B62K 1/00 280/301 |
| 2015/0129327 | A1* | 5/2015 | Yoshino | B62K 1/00 301/5.23 |
| 2015/0251563 | A1* | 9/2015 | Shirokura | G05D 1/0891 701/22 |
| 2017/0210444 | A1* | 7/2017 | Yada | B60B 19/125 |
| 2018/0037283 | A1* | 2/2018 | Kato | B62H 1/02 |
| 2018/0111655 | A1* | 4/2018 | Inada | B62M 13/00 |
| 2018/0304953 | A1* | 10/2018 | Itai | B62J 23/00 |
| 2021/0379929 | A1* | 12/2021 | Yada | B62K 11/007 |
| 2021/0380199 | A1* | 12/2021 | Yada | B62K 21/00 |
| 2022/0032683 | A1* | 2/2022 | Oshima | B60B 19/003 |
| 2022/0289331 | A1* | 9/2022 | Yada | F16H 13/08 |
| 2023/0249590 | A1* | 8/2023 | Yada | B60N 2/0231 296/65.01 |
| 2023/0249591 | A1* | 8/2023 | Yada | B60N 2/24 297/284.1 |
| 2023/0249767 | A1* | 8/2023 | Yada | A61G 5/1059 280/283 |
| 2023/0249770 | A1* | 8/2023 | Yada | B62J 1/06 280/283 |
| 2023/0294788 | A1* | 9/2023 | Ozaki | A61G 5/043 701/49 |

FOREIGN PATENT DOCUMENTS

| | | | | |
|---|---|---|---|---|
| WO | WO-2011033579 | A1* | 3/2011 | B60B 19/003 |
| WO | WO-2011033580 | A1* | 3/2011 | B62K 1/00 |
| WO | WO-2011036693 | A1* | 3/2011 | B62J 25/00 |
| WO | WO-2011036694 | A1* | 3/2011 | B62J 1/00 |

* cited by examiner

DRIVE DISKS

TECHNICAL FIELD

The present invention relates to drive disks used for a frictional drive unit.

BACKGROUND ART

There is a known frictional drive unit used as a drive device for an inverted pendulum vehicle (for example, JP2011-63214A). The frictional drive unit includes a frame, a pair of drive disks rotatably supported by the frame, an annular main wheel arranged between the pair of drive disks, and a pair of actuators configured to independently drive each drive disk. The drive disk has a disk-shaped base that is rotatable with respect to the frame and a plurality of drive rollers rotatably supported by an outer circumferential part of the base so as to come into contact with the main wheel. The drive rollers are arranged in rotationally symmetrical positions around a rotational axis of the base. The main wheel can rotate around a central axis and an annular axis. The frictional drive unit controls the rotation of the main wheel around the central axis and the annular axis by controlling the rotational direction and the rotational amount of the pair of drive disks, thereby moving the inverted pendulum vehicle in all directions, including the front direction, the rear direction, the left direction, and the right direction.

Each drive disk according to JP2011-63214A has slots for receiving the drive rollers, bearing holes formed in a side wall defining each slot, and roller axes inserted into each bearing hole along its axial direction to rotatably support each drive roller.

Each drive disk according to JP2011-63214A has bearing walls which enables the base to rotatably support the drive rollers and the slots formed between the bearing walls. Since the bearing walls and slots are arranged in different directions, it is difficult to form these elements and the cost is increased accordingly. There is a probable manufacturing method in which the bearing walls are prepared as separate members and then assembled to the base. However, such a manufacturing method may increase the number of operations because a large number of bearing walls should be assembled to the base.

SUMMARY OF THE INVENTION

In view of such a problem of the prior art, a primary object of the present invention is to provide drive disks that can be manufactured easily.

To achieve such an object, one aspect of the present invention provides drive disks (4) arranged on either side of an annular main wheel (5) and configured to rotate the main wheel around a central axis and an annular axis by applying a frictional force to the main wheel, each of the drive disks comprising: a disk-shaped base (20) rotatably supported by a frame (3); and a plurality of rollers (21) rotatably supported by an outer circumferential part of the base, inclined to each other, and coming into contact with the main wheel, wherein the base includes a first sheet metal member (47) and a second sheet metal member (48), the first sheet metal member includes a first central part (51) and a plurality of first arm parts (52) extending radially outward from the first central part, the second sheet metal member includes a second central part (61) and a plurality of second arm parts (62) extending radially outward from the second central part, the first central part and the second central part are arranged coaxially with each other, each of the rollers has a first end (43A) and a second end (43B) in a rotational axis direction thereof, each of the first arm parts includes a first supporting part (71) and a second supporting part (72) arranged inside of the first supporting part in a radial direction of the base, each of the second arm parts includes a third supporting part (73) and a fourth supporting part (74) arranged outside of the third supporting part in the radial direction of the base, the first end of one of two rollers adjacent to each other is supported by the first supporting part and the second end thereof is supported by the third supporting part, the first end of the other of the two rollers adjacent to each other is supported by the fourth supporting part and the second end thereof is supported by the second supporting part, the first supporting part and the second supporting part are inclined to each other with a first bent part (54E) therebetween, and the third supporting part and the fourth supporting part are inclined to each other with a second bent part (67E) therebetween.

According to this aspect, the base that rotatably supports the rollers can be formed by two sheet metal members, so that the drive disks can be manufactured easily.

In the above aspect, preferably, the first supporting part and the third supporting part are arranged parallel to each other, and the second supporting part and the fourth supporting part are arranged parallel to each other.

According to this aspect, the first arm parts and the second arm parts can stably support each roller.

In the above aspect, preferably, in circumferential directions of the first sheet metal member and the second sheet metal member, a tip end of each of the second arm parts is arranged between tip ends of two first arm parts adjacent to each other.

According to this aspect, in the circumferential directions of the first sheet metal member and the second sheet metal member, the first arm parts and the second arm parts are arranged alternately. Further, the rollers can be arranged in the respective spaces between the first arm parts and the second arm parts.

In the above aspect, preferably, the tip end of each of the first arm parts and the tip end of each of the second arm parts are arranged on one virtual plane perpendicular to a rotational axis of the base.

According to this aspect, in the circumferential direction of the base, the first arm parts and the second arm parts are arranged alternately.

In the above aspect, preferably, the tip end of each of the first arm parts extends outward in a radial direction of the base, and the tip end of each of the second arm parts extends inward in the radial direction of the base.

According to this aspect, the first arm parts and the second arm parts can be arranged alternately in the circumferential direction of the base without interfering with each other.

Thus, according to the above aspects, it is possible to provide drive disks that can be manufactured easily.

DESCRIPTION OF THE PREFERRED EMBODIMENT(S)

In the following, an embodiment of drive disks according to the present invention will be described with reference to the drawings. The drive disks are used for a frictional drive unit. The frictional drive unit is used for an inverted pendulum vehicle, for example.

Figure 1:
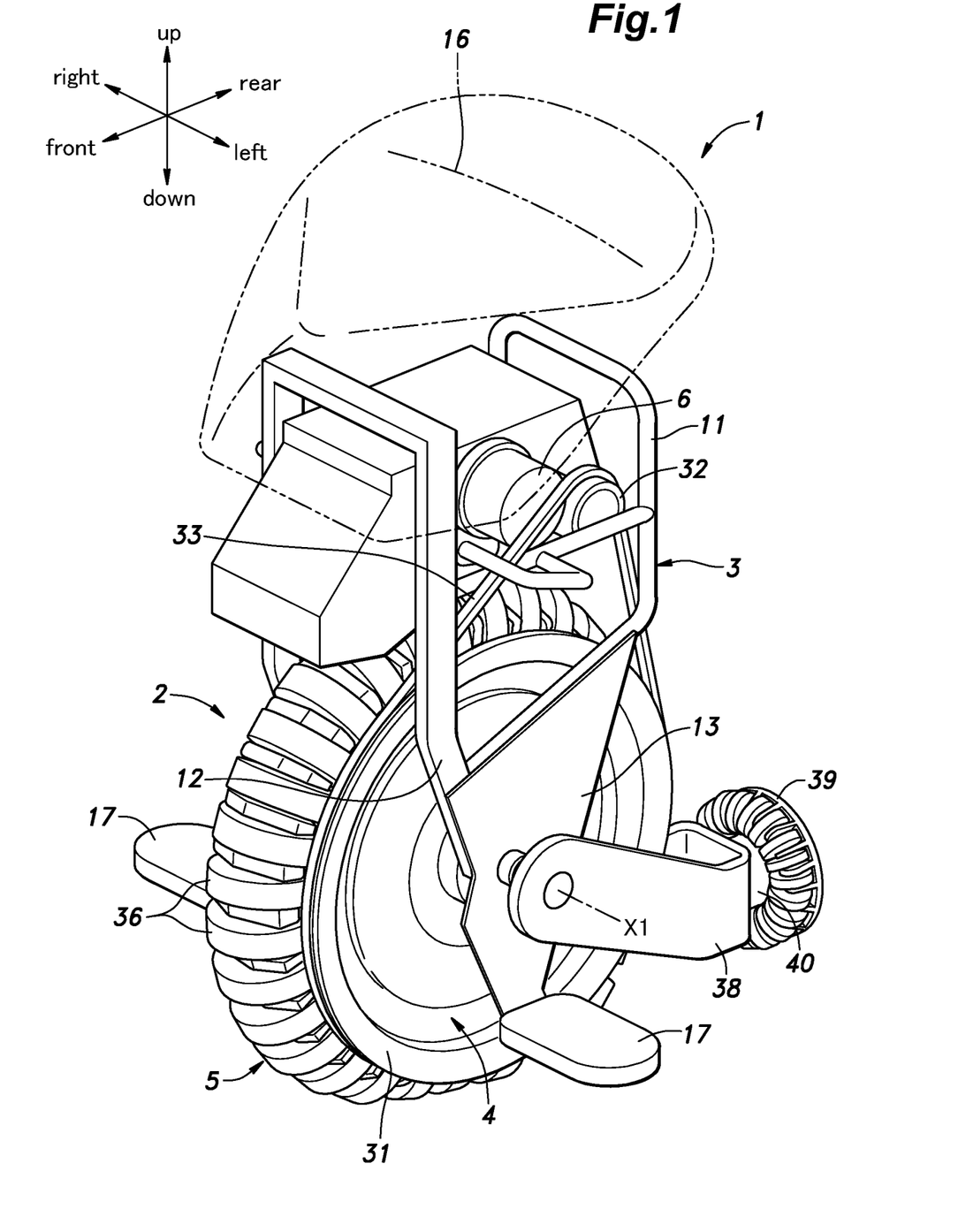
FIG. 1 is a perspective view of an inverted pendulum vehicle including drive disks according to an embodiment.
Figure 2:
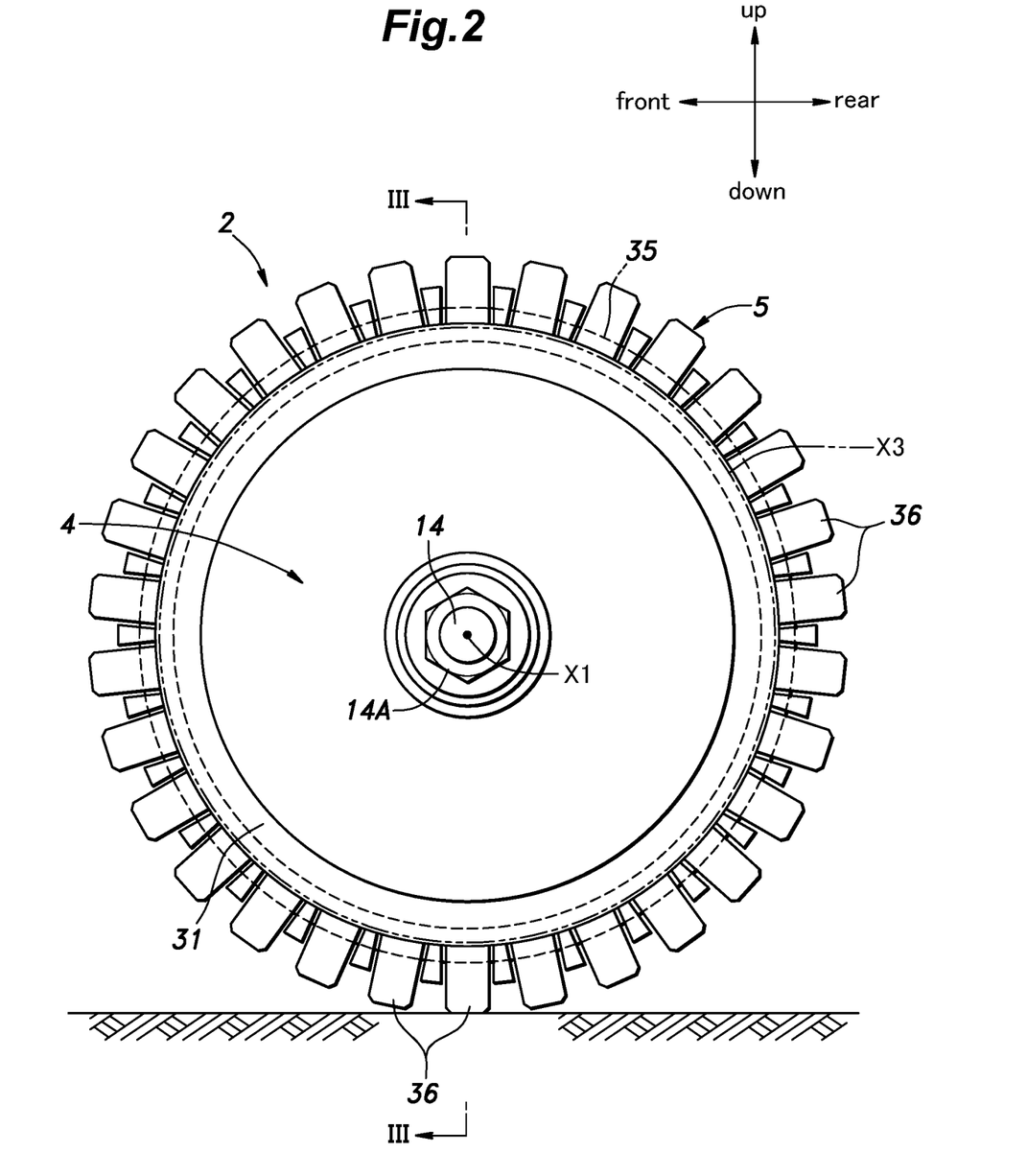
FIG. 2 is a side view of a frictional drive unit.
Figure 3:
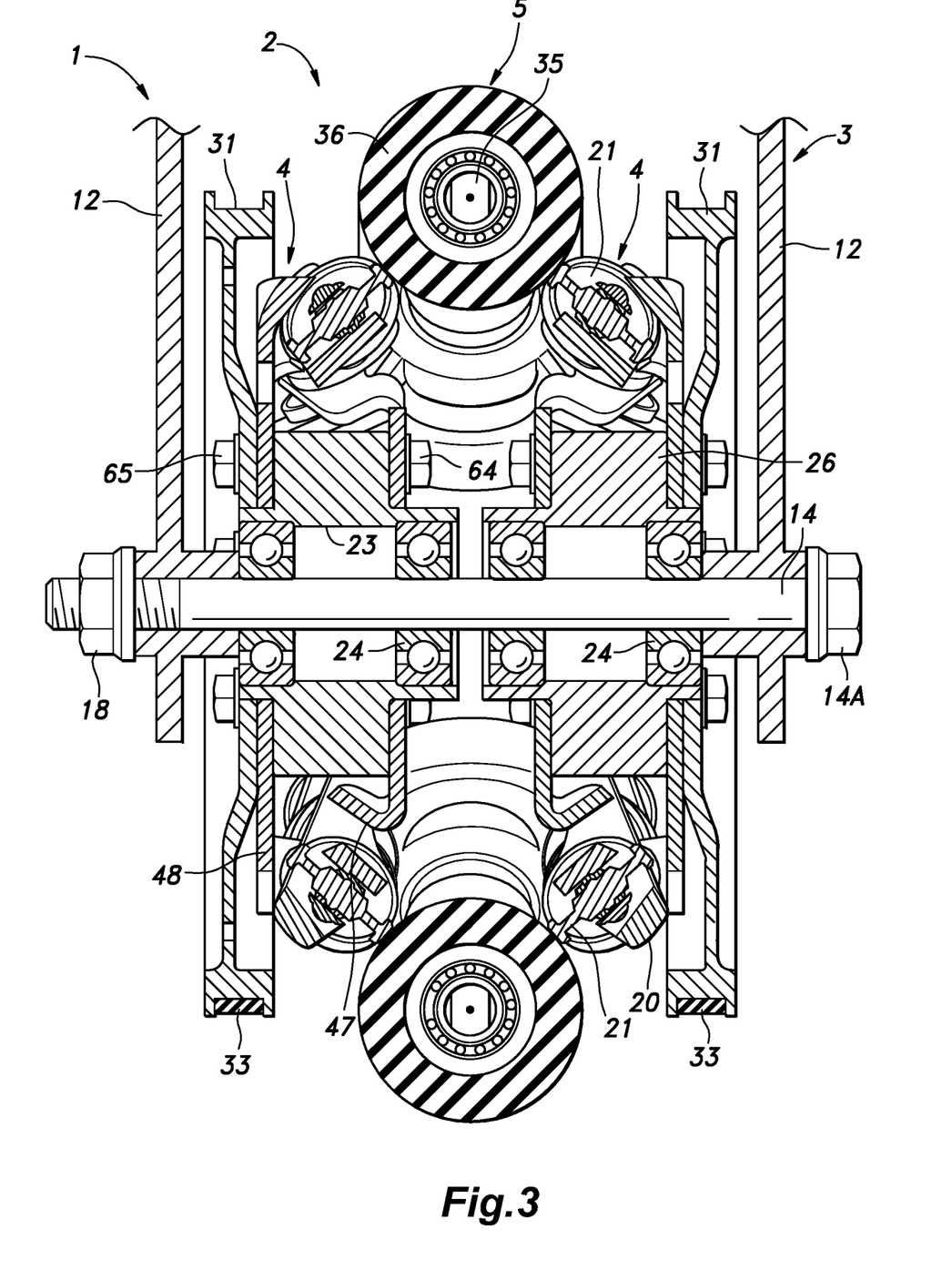
FIG. 3 is a sectional view taken along a line III-III of FIG. 2.

As shown in FIGS. 1 to 3, an inverted pendulum vehicle 1 includes a frictional drive unit 2. The frictional drive unit 2 includes a frame 3, a pair of drive disks 4 (left and right drive disks 4) rotatably supported by the frame 3, an annular main wheel 5 arranged between the pair of drive disks 4, and a pair of actuators 6 configured to independently rotate the pair of drive disks 4.

As shown in FIG. 1, the frame 3 includes an upper frame 11 formed in a substantial parallelepiped, left and right lower frames 12 extending downward from left and right lower ends of the upper frame 11, left and right lower plates 13 respectively connected to the lower frames 12, and a supporting shaft 14 (see FIG. 3) extending between the left and right lower frames 12. A saddle 16 to support the buttocks of the occupant is attached to an upper part of the upper frame 11. Left and right footrests 17 to support the soles of the occupant are attached to lower ends of the lower plates 13.

As shown in FIG. 3, the supporting shaft 14 extends in the lateral direction, and is connected to the left and right lower frames 12. A left end of the supporting shaft 14 passes through the left lower frame 12, and a right end of the supporting shaft 14 passes through the right lower frame 12. The supporting shaft 14 is provided with a bolt head 14A at a base end thereof, and comes into contact with one lower frame 12 at the bolt head 14A. A nut 18 is attached to a tip end of the supporting shaft 14 so as to fix the supporting shaft 14 to the other lower frame 12.

The drive disks 4 are respectively arranged on either side of the annular main wheel 5, and configured to rotate the main wheel 5 around a central axis and to rotate the main wheel 5 (more specifically, an outer circumferential part of the main wheel 5) around annular axis by applying a frictional force to the main wheel 5. Each drive disk 4 includes a disk-shaped base 20 rotatably supported by the frame 3 and a plurality of drive rollers 21 (the rollers) rotatably supported by an outer circumferential part of the base 20, inclined to each other, and coming into contact with the main wheel 5.

In the present embodiment, the left and right drive disks 4 are rotatably supported by the supporting shaft 14, and are arranged between the left and right lower frames 12. Each of the left and right drive disks 4 is formed in a disk shape, and has a bearing hole 23 (through hole) in the center thereof. The supporting shaft 14 passes through the bearing hole 23 of each of the left and right drive disks 4. The left and right drive disks 4 are supported by the supporting shaft 14 so as to rotate around an axis X1 (central axis). A bearing 24 such as a ball bearing is attached to the bearing hole 23, and each of the left and right drive disks 4 is supported by the supporting shaft 14 via the bearing 24.

Each of the left and right drive disks 4 has an opposite surface. The opposite surface of the left drive disk 4 is opposite to the opposite surface of the right drive disk 4. A driven pulley 31 is provided on the opposite surface of each of the left and right drive disks 4. The driven pulley 31 is provided coaxially with each of the left and right drive disks 4. As shown in FIG. 1, the upper frame 11 is provided with a right actuator 6 to drive the right drive disk 4 and a left actuator 6 to drive the left drive disk 4. Each actuator 6 consists of, for example, an electric motor. A drive pulley 32 is provided on an output shaft of each actuator 6. The drive pulley 32 and the driven pulley 31, which correspond to each other in the lateral direction, are connected by a belt 33. The left and right actuators 6 can rotate independently of each other, thereby rotating the left and right drive disks 4 independently.

As shown in FIGS. 1 to 3, the main wheel 5 has an annular shape, and is arranged between the pair of drive disks 4 so as to be coaxial therewith. The main wheel 5 comes into contact with the plurality of drive rollers 21, and can rotate around the central axis and the annular axis. In the present embodiment, the main wheel 5 includes an annular core member 35 and a plurality of driven rollers 36 rotatably supported by the core member 35. The plurality of driven rollers 36 are arranged at equal intervals in the circumferential direction of the core member 35. Each driven roller 36 is rotatably supported by the core member 35 around the axis X3 (annular axis) of the annular core member 35. More specifically, each driven roller 36 can rotate around the tangent of the core member 35 at the respective position with respect to the core member 35. Upon receiving an external force, each driven roller 36 rotates with respect to the core member 35.

The main wheel 5 is arranged along the outer circumferential parts of the left and right drive disks 4, and comes into contact with the plurality of drive rollers 21 of the left and right drive disks 4. The drive rollers 21 of the left and right drive disks 4 come into contact with an inner circumferential part of the main wheel 5, and hold the main wheel 5 from either lateral side thereof. Further, the drive rollers 21 of the left and right drive disks 4 come into contact with the inner circumferential part of the main wheel 5, thereby suppressing the displacement of the drive disks 4 in the radial direction around the axis X1. Accordingly, the main wheel 5 is supported by the left and right drive disks 4, and the central axis of the main wheel 5 (the core member 35) is arranged coaxially with the axis X1 of the left and right drive disks 4. The plurality of driven rollers 36 of the main wheel 5 come into contact with the plurality of drive rollers 21 of the left and right drive disks 4.

As shown in FIG. 1, left and right front ends of a tail wheel arm 38 are supported by the left and right lower plates 13 such that the tail wheel arm 38 can rotate around a rotational axis extending in the lateral direction. The rotational axis of the tail wheel arm 38 may coincide with the axis X1 of the drive disks 4. The tail wheel arm 38 extends rearward from a front end thereof, which is bifurcated. A tail wheel 39 is provided at a rear end of the tail wheel arm 38. The tail wheel 39 is, for example, an omni-wheel, and is supported by a rear end of the tail wheel arm 38 so as to rotate around an axis extending in the front-and-rear direction. The tail wheel 39 is rotated by a tail wheel motor 40, which is an electric motor provided at the rear end of the tail wheel arm 38.

In a case where the left and right drive disks 4 rotate in the same direction at the same rotational speed, the main wheel 5 rotates together with the left and right drive disks 4.

Namely, the main wheel 5 rotates around its own rotational axis, which coincides with the axis X1, and the inverted pendulum vehicle 1 moves forward or backward. At this time, the drive rollers 21 of the drive disks 4 and the driven rollers 36 of the main wheel 5 do not rotate with respect to the core member 35.

In a case where there is a difference in rotational speeds of the left and right drive disks 4, a component force is applied from the drive rollers 21 of the left and right drive disks 4 to the driven rollers 36 of the main wheel 5. The component force is a force in a direction perpendicular to a force in the circumferential direction (tangential direction) caused by the rotation of the left and right drive disks 4. The axis of each drive roller 21 is inclined to the circumferential direction of the drive roller 21 (the left and right drive disks 4), and thus the component force is generated due to the difference in the rotational speeds of the left and right drive disks 4. Owing to this component force, the drive rollers 21 rotate with respect to the base 20 and the driven rollers 36 rotate with respect to the core member 35. Accordingly, the main wheel 5 generates a driving force in the direction along the rotational axis, namely, in the lateral direction of the inverted pendulum vehicle 1. Thus, the inverted pendulum vehicle 1 rotates to the left or right around the tail wheel 39.

In the following, one of the pair of drive disks 4 (hereinafter simply referred to as "drive disk 4") will be described in detail with reference to FIGS. 4 to 8. With regard to two directions along the axis X1 of the drive disk 4, one direction toward a side of the main wheel 5 is defined as "the first direction", and the other direction opposite to the first direction is defined as "the second direction".

Figure 8:
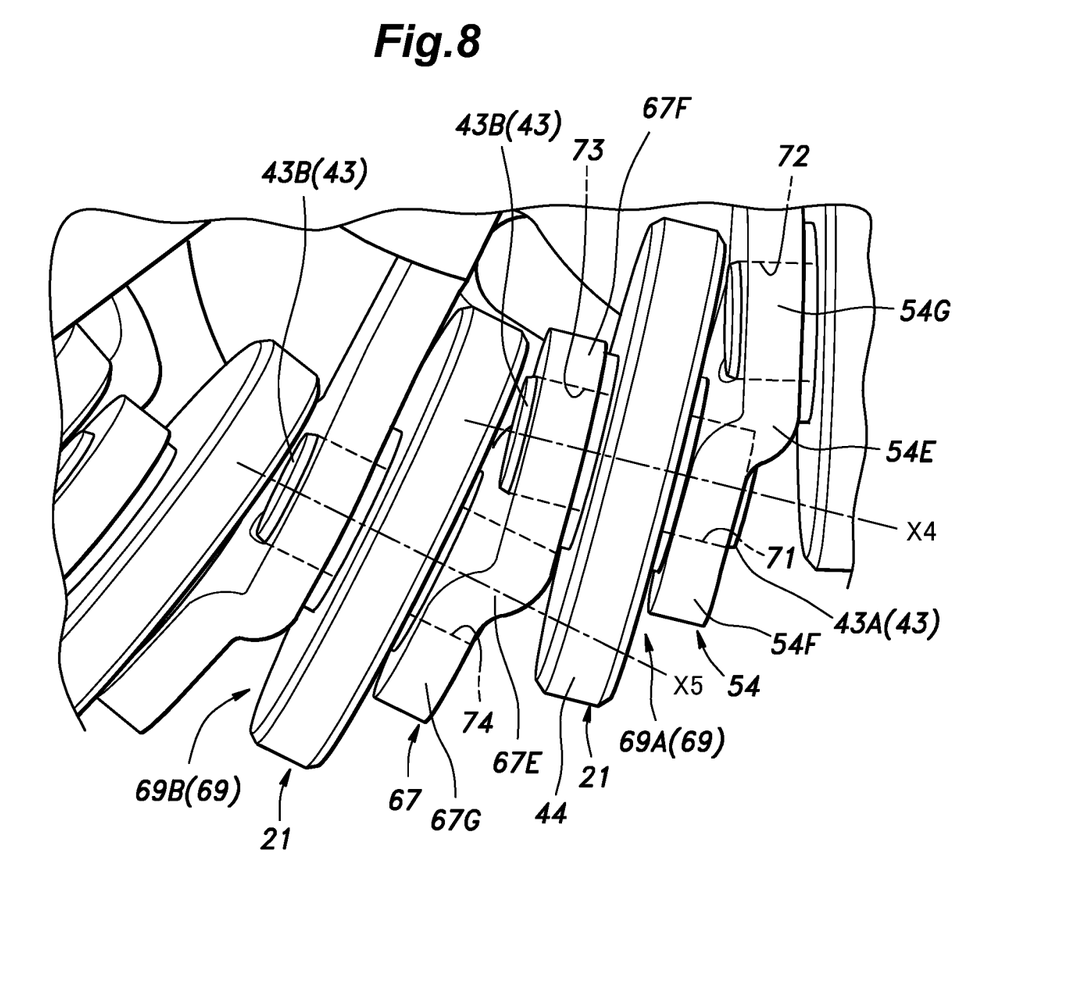
FIG. 8 is a perspective view showing the roller receiving parts of the drive disk.

As shown in FIG. 8, each drive roller 21 includes a shaft 43 and a roller body 44. The roller body 44 is rotatably provided in the center of the shaft 43, and has a larger diameter than the shaft 43. With regard to the drive disk 4, the drive rollers 21 are arranged in rotationally symmetrical positions around the axis X1 of the drive disk 4. The drive rollers 21 are arranged in the outer circumferential part of the drive disk 4 at equal intervals in the circumferential direction thereof. The shaft 43 of each drive roller 21 is inclined to the circumferential direction (tangential direction) of the drive disk 4, and is also inclined to a plane perpendicular to the axis X1 of the drive disk 4. A part of each drive roller 21 protrudes in the first direction with respect to the base 20. An end of the shaft 43 arranged on one side in the circumferential direction of the drive disk 4 is defined as a first end 43A, and an end of the shaft 43 on the side opposite to the one side in the circumferential direction thereof is defined as a second end 43B.

Figure 4:
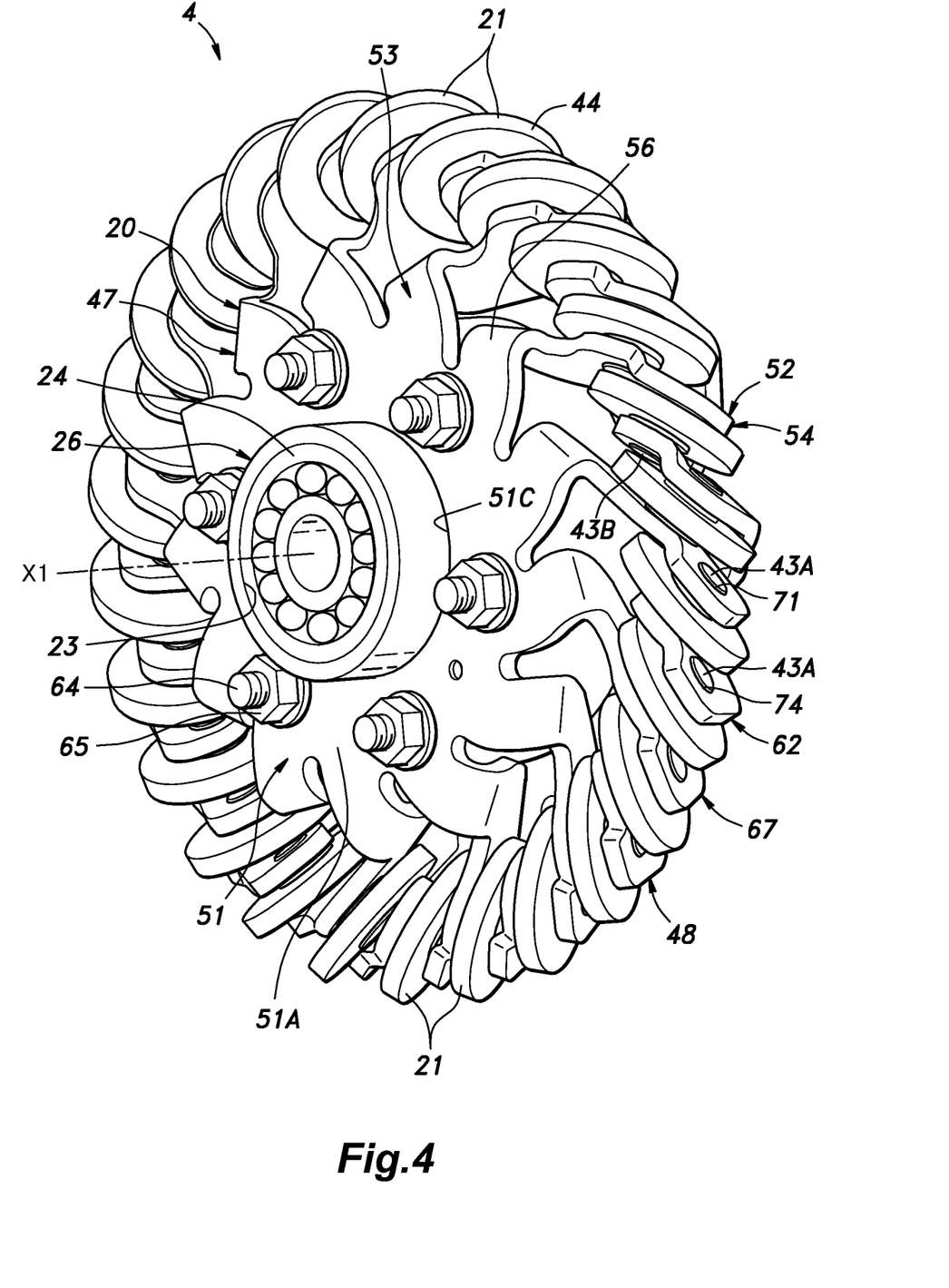
FIG. 4 is a perspective view of the drive disk including drive rollers.

As shown in FIG. 4, the base 20 of the drive disk 4 includes a first sheet metal member 47 and a second sheet metal member 48. Each of the first sheet metal member 47 and the second sheet metal member 48 is formed by cutting, drilling, and bending one flat sheet metal. Each of the first sheet metal member 47 and the second sheet metal member 48 may be made of alloy steel such as stainless steel, carbon steel, or nonferrous material such as aluminum.

Figure 5:
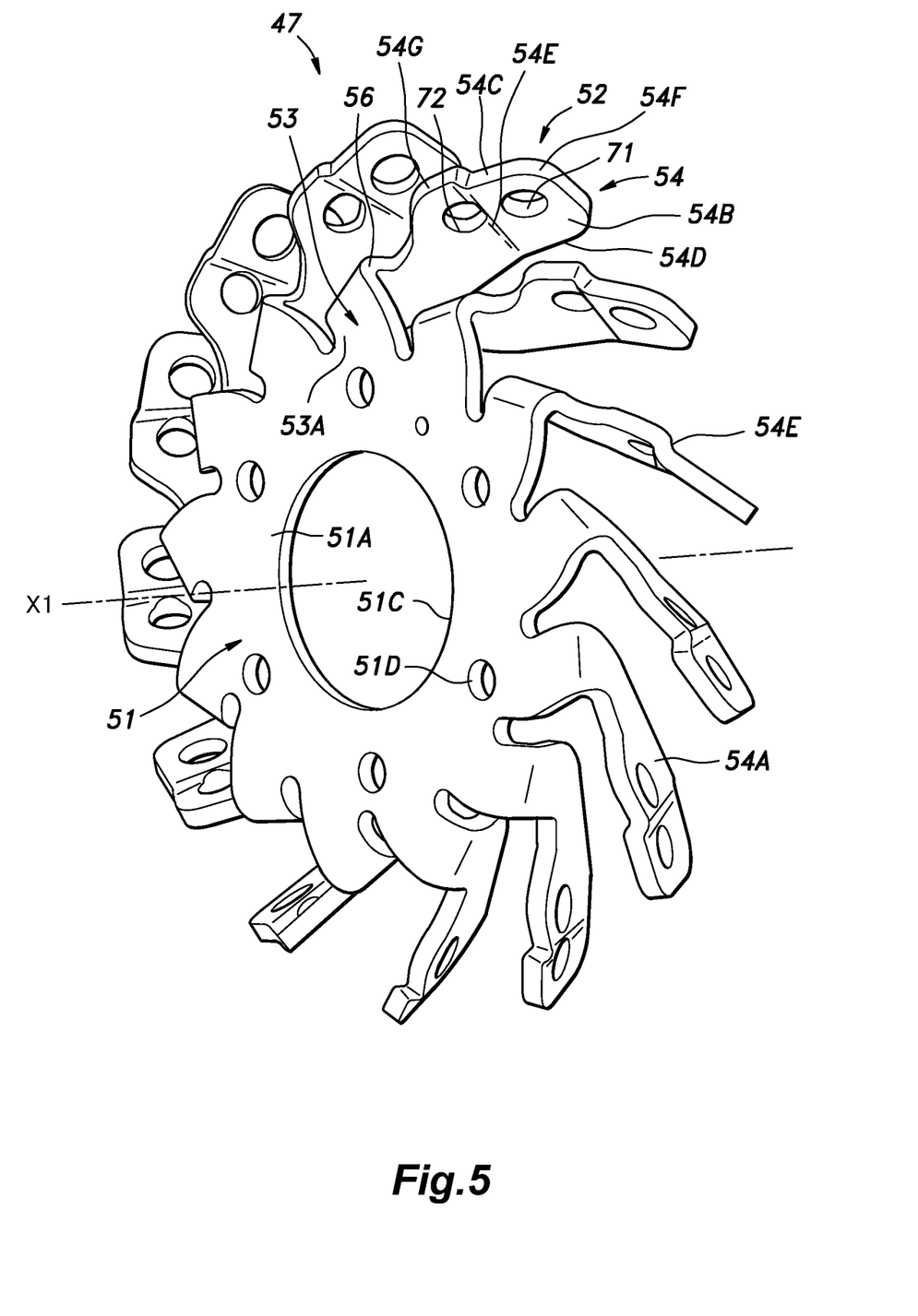
FIG. 5 is a perspective view of a first sheet metal member.

As shown in FIG. 5, the first sheet metal member 47 includes a first central part 51 and a plurality of first arm parts 52 extending radially outward from the first central part 51. The first central part 51 is formed in a disk shape. The first central part 51 has a first surface 51A facing toward the first direction and a second surface 51B facing toward the second direction. The axis of the first central part 51 coincides with the axis X1 of the drive disk 4 and the axis of the base 20.

A circular first hole 51C, which penetrates from the first surface 51A to the second surface 51B, is formed in the center of the first central part 51. Further, the first central part 51 is provided with a plurality of first bolt holes 51D around the first hole 51C. The first hole 51C is arranged coaxially with the axis X1 of the drive disk 4.

The plurality of first arm parts 52 are formed to be rotationally symmetrical with each other around the axis X1 of the drive disk 4. The plurality of first arm parts 52 are arranged at equal intervals around the axis X1 of the drive disk 4. Each first arm part 52 includes a first arm base end 53 extending radially outward from the first central part 51 and a first arm tip end 54 extending from a tip end of the first arm base end 53. The first arm tip end 54 extends in a direction different from a direction in which the first arm base end 53 extends.

The first arm base end 53 is arranged on the same plane as the first central part 51. The extending direction of the first arm base end 53 may make a prescribed angle with the radial direction of the first central part 51 (namely, the extending direction of the first arm base end 53 may be inclined to the radial direction of the first central part 51) when viewed in the direction along the axis X1 of the drive disk 4. The first arm base end 53 is formed in a flat plate shape. The first arm base end 53 includes a first surface 53A arranged on the same plane as the first surface 51A of the first central part 51 and a second surface 53B arranged on the same plane as the second surface 51B of the first central part 51.

A first bent part 56 which extends linearly is formed at the boundary between the first arm tip end 54 and the first arm base end 53. At the first bent part 56, the first arm tip end 54 is bent from the first arm base end 53 in the second direction such that an acute angle is formed between the first arm base end 53 and the first arm tip end 54.

The first arm tip end 54 extends outward in the radial direction of the drive disk 4 from a tip end of the first arm base end 53. Further, when viewed in the direction along the axis X1 of the drive disk 4, the first arm tip end 54 extends in a direction perpendicular to the first arm base end 53. Further, when viewed from the side of the first surface 51A of the first central part 51, the first arm tip end 54 extends from the first arm base end 53 in the clockwise direction around the axis X1 of the drive disk 4.

The first arm tip end 54 is formed in a flat plate shape. A first surface 54A of the first arm tip end 54 faces toward the second direction and toward one side in the circumferential direction around the axis X1 of the drive disk 4. A second surface 54B of the first arm tip end 54 faces toward the first direction and toward the other side in the circumferential direction around the axis X1 of the drive disk 4.

The first surface 54A of the first arm tip end 54 is connected to the first surface 53A of the first arm base end 53 via a curved surface of the first bent part 56. Similarly, the second surface 54B of the first arm tip end 54 is connected to the second surface 53B of the first arm base end 53 via a curved surface of the first bent part 56. The first arm tip end 54 includes a first side edge 54C and a second side edge 54D, which extend in the longitudinal direction of the first arm tip end 54. The first side edge 54C is arranged on a side of the first direction with respect to the second side edge 54D.

Figure 6:
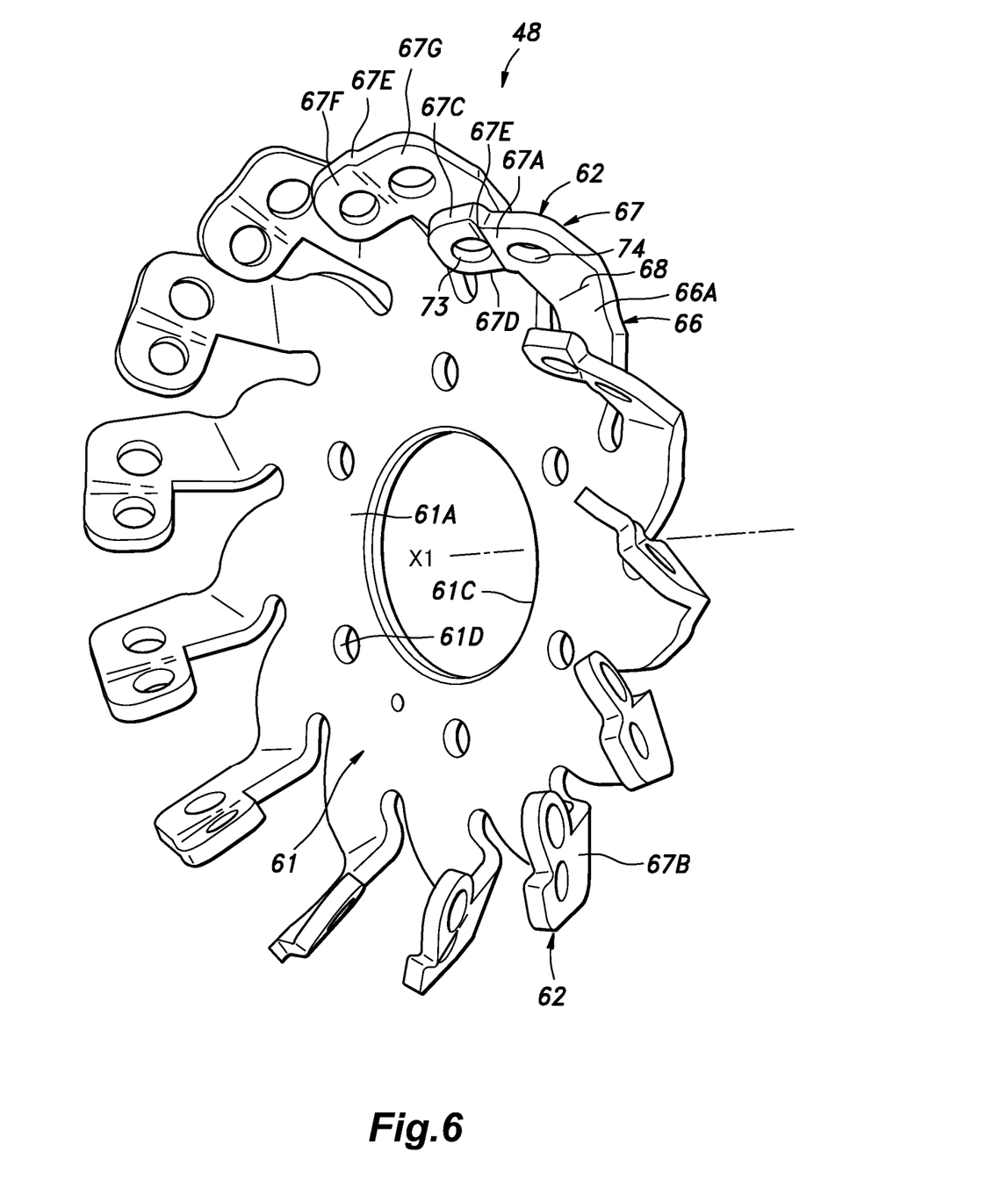
FIG. 6 is a perspective view of a second sheet metal member.

As shown in FIGS. 3 and 4, the second sheet metal member 48 is arranged on a side of the second direction with respect to the first sheet metal member 47. As shown in FIG. 6, the second sheet metal member 48 includes a second central part 61 and a plurality of second arm parts 62 extending radially outward from the second central part 61.

The second central part 61 is formed in a disk shape. The second central part 61 has a first surface 61A facing toward the first direction and a second surface 61B facing toward the second direction. The axis of the second central part 61 is arranged coaxially with the axis X1 of the drive disk 4. The first central part 51 and the second central part 61 are arranged coaxially with each other. The radius of the second central part 61 is larger than the radius of the first central part 51.

A circular second hole 61C, which penetrates from the first surface 61A to the second surface 61B, is formed in the center of the second central part 61. Further, the second central part 61 is provided with a plurality of second bolt holes 61D around the second hole 61C. The second hole 61C is arranged coaxially with the axis X1 of the drive disk 4.

As shown in FIG. 3, the first central part 51 and the second central part 61 are fastened by a plurality of bolts 64 and nuts 65 via a spacer 26. Each bolt 64 passes through the first bolt hole 51D, a bolt hole (not shown) formed in the spacer 26, and the second bolt hole 61D. The bearing hole 23 is arranged in the central part of the spacer 26 and formed coaxially with the axis X1 of the drive disk 4.

As shown in FIG. 6, the plurality of second arm parts 62 are formed to be rotationally symmetrical with each other around the axis X1 of the drive disk 4. The plurality of second arm parts 62 are arranged at equal intervals around the axis X1 of the drive disk 4. Each second arm part 62 includes a second arm base end 66 extending radially outward from the second central part 61 and a second arm tip end 67 extending from a tip end of the second arm base end 66. The second arm tip end 67 extends in a direction different from a direction in which the second arm base end 66 extends.

The second arm base end 66 is arranged on the same plane as the second central part 61. The extending direction of the second arm base end 66 may make a prescribed angle with the radial direction of the second central part 61 (namely, the extending direction of the second arm base end 66 may be inclined to the radial direction of the second central part 61) when viewed in the direction along the axis X1 of the drive disk 4. The second arm base end 66 is formed in a flat plate shape. The second arm base end 66 includes a first surface 66A arranged on the same plane as the first surface 61A of the second central part 61 and a second surface 66B arranged on the same plane as the second surface 61B of the second central part 61.

A second bent part 68 which extends linearly is formed at the boundary between the second arm tip end 67 and the second arm base end 66. At the second bent part 68, the second arm tip end 67 is bent from the second arm base end 66 in the first direction such that an obtuse angle is formed between the second arm base end 66 and the second arm tip end 67.

The second arm tip end 67 extends inward in the radial direction of the drive disk 4 from a tip end of the second arm base end 66. Further, when viewed from the side of the first surface 61A of the second central part 61, the second arm tip end 67 extends from the second arm base end 66 in the counterclockwise direction around the axis X1 of the drive disk 4.

The second arm tip end 67 is formed in a flat plate shape. A first surface 67A of the second arm tip end 67 faces toward the first direction and toward one side in the circumferential direction around the axis X1 of the drive disk 4. A second surface 67B of the second arm tip end 67 faces toward the second direction and toward the other side in the circumferential direction around the axis X1 of the drive disk 4.

The first surface 67A of the second arm tip end 67 is connected to the first surface 66A of the second arm base end 66 via a curved surface of the second bent part 68. Similarly, the second surface 67B of the second arm tip end 67 is connected to the second surface 66B of the second arm base end 66 via a curved surface of the second bent part 68. The second arm tip end 67 includes a third side edge 67C and a fourth side edge 67D, which extend in the longitudinal direction of the second arm tip end 67. The third side edge 67C is arranged on a side of the first direction with respect to the fourth side edge 67D.

Figure 7:
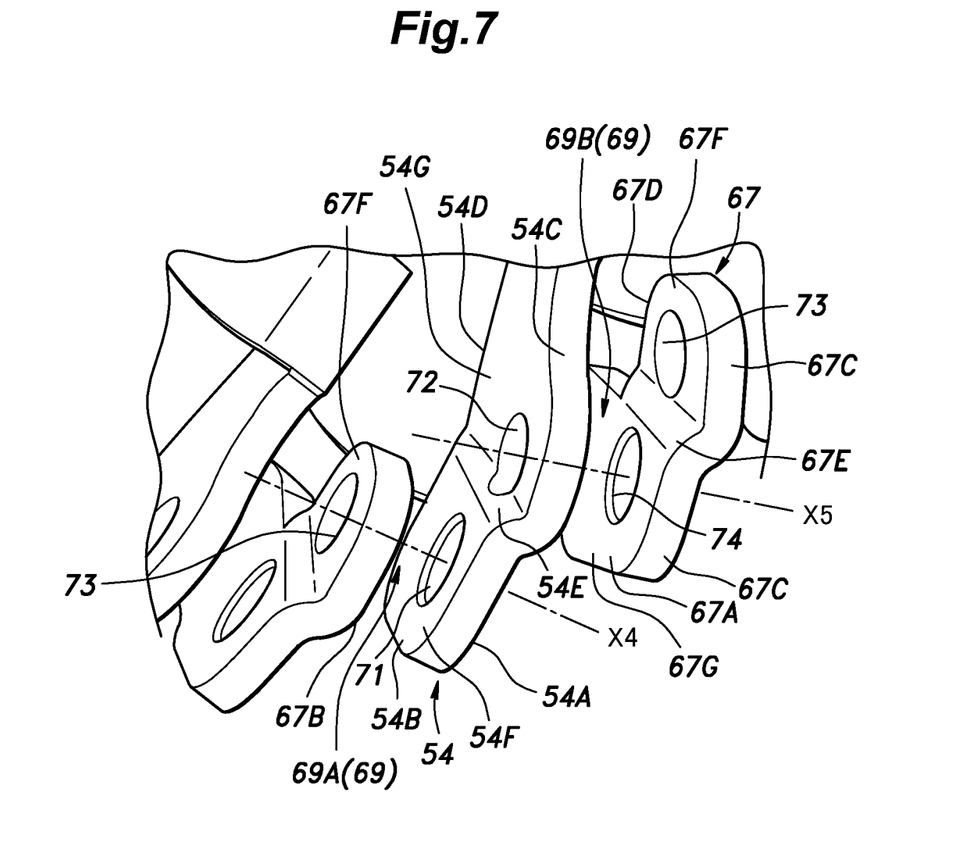
FIG. 7 is a perspective view of roller receiving parts of the drive disk without the drive rollers.

As shown in FIGS. 4, 7, and 8, in the circumferential direction of the base 20, one of the second arm tip ends 67 is arranged between two first arm tip ends 54 adjacent to each other. Similarly, in the circumferential direction of the base 20, one of the first arm tip ends 54 is arranged between two second arm tip ends 67 adjacent to each other. Namely, the first arm tip ends 54 and the second arm tip ends 67 are arranged alternately in the circumferential direction of the base 20 around the axis X1. Each first arm tip end 54 and each second arm tip end 67 are arranged on one virtual plane perpendicular to the rotational axis of the base 20.

The drive disk 4 includes a plurality of roller receiving parts 69 that receive the roller bodies 44 of the drive rollers 21. Each roller receiving part 69 is defined by the first arm tip end 54 and the second arm tip end 67 adjacent to each other. The roller receiving parts 69 include first roller receiving parts 69A respectively defined by the second surface 54B of the first arm tip end 54 and the second surface 67B of the second arm tip end 67 and second roller receiving parts 69B respectively defined by the first surface 54A of the first arm tip end 54 and the first surface 67A of the second arm tip end 67. The first roller receiving parts 69A and the second roller receiving parts 69B are alternately arranged in the circumferential direction of the base 20. Each roller receiving part 69 opens toward the first direction.

As shown in FIGS. 4 and 5, each first arm part 52 includes a first supporting part 71 and a second supporting part 72. The second supporting part 72 is arranged inside of the first supporting part 71 in the radial direction of the base 20. The first supporting part 71 and the second supporting part 72 are provided in the first arm tip end 54, and the second supporting part 72 is arranged closer to a base end of the first arm tip end 54 than the first supporting part 71.

As shown in FIGS. 4 and 6, each second arm part 62 includes a third supporting part 73 and a fourth supporting part 74. The fourth supporting part 74 is arranged outside of the third supporting part 73 in the radial direction of the base 20. The third supporting part 73 and the fourth supporting part 74 are provided in the second arm tip end 67, and the fourth supporting part 74 is arranged closer to a base end of the second arm tip end 67 than the third supporting part 73.

As shown in FIGS. 4 and 8, the first end 43A of one of two adjacent drive rollers 21 (namely, two drive rollers 21 adjacent to each other) is supported by the first supporting part 71, and the second end 43B thereof is supported by the third supporting part 73. Further, the first end 43A of the other of the two adjacent drive rollers 21 is supported by the fourth supporting part 74, and the second end 43B thereof is supported by the second supporting part 72. Namely, each first arm part 52 and each second arm part 62 support the first end 43A of one of two adjacent drive rollers 21 and the second end 43B of the other of the two adjacent drive rollers 21.

As shown in FIGS. 5 to 7, the first to fourth supporting parts 71 to 74 consist of through holes that receive the shaft 43 of each drive roller 21, and penetrate through the first arm tip end 54 or the second arm tip end 67 in the thickness direction thereof.

As shown in FIG. 8, the first arm tip end 54 includes a first bent part 54E between the first supporting part 71 and the second supporting part 72. Accordingly, the first bent part 54E divides the first arm tip end 54 into a first part 54F provided with the first supporting part 71 and a second part 54G provided with the second supporting part 72. The first part 54F (first supporting part 71) and the second part 54G (second supporting part 72) are inclined to each other with the first bent part 54E therebetween. Further, the axis of the first supporting part 71 and the axis of the second supporting part 72 are inclined to each other.

Similarly, the second arm tip end 67 includes a second bent part 67E between the third supporting part 73 and the fourth supporting part 74. Accordingly, the second bent part 67E divides the second arm tip end 67 into a third part 67F provided with the third supporting part 73 and a fourth part 67G provided with the fourth supporting part 74. The third part 67F and the fourth part 67G are inclined to each other with the second bent part 67E therebetween. Further, the axis of the third supporting part 73 and the axis of the fourth supporting part 74 are inclined to each other.

The first part 54F and the third part 67F, which are arranged on either side of each first roller receiving part 69A, are arranged parallel to each other. Further, the axes of the first supporting part 71 and the third supporting part 73 are arranged coaxially with a common axis X4 (an axis common in the first supporting part 71 and the third supporting part 73). The fourth part 67G and the second part 54G, which are arranged on either side of each second roller receiving part 69B, are arranged parallel to each other. Further, the axes of the fourth supporting part 74 and the second supporting part 72 are arranged coaxially with a common axis X5 (an axis common in the fourth supporting part 74 and the second supporting part 72).

In the following, a method for attaching the drive roller 21 to the base 20 will be described. When placing the drive roller 21 in the first roller receiving part 69A, the operator places the roller body 44 in the first roller receiving part 69A such that the roller body 44 is coaxial with the first supporting part 71 and the third supporting part 73. Then, the operator inserts the shaft 43 into the first supporting part 71, the roller body 44, and the third supporting part 73 in this order. The second end 43B of the shaft 43 is press-fitted into and fixed to the third supporting part 73, and the first end 43A thereof is press-fitted into and fixed to the first supporting part 71. When the shaft 43 is press-fitted into the first supporting part 71 and the third supporting part 73, an attachment base may be used. For example, the attachment base engages with the first supporting part 71 and the third supporting part 73, thereby fixing the positions of the first supporting part 71 and the third supporting part 73.

Similarly, when placing the drive roller 21 in the second roller receiving part 69B, the operator places the roller body 44 in the second roller receiving part 69B such that the roller body 44 is coaxial with the fourth supporting part 74 and the second supporting part 72. Then, the operator inserts the shaft 43 into the fourth supporting part 74, the roller body 44, and the second supporting part 72 in this order. The second end 43B of the shaft 43 is press-fitted into and fixed to the second supporting part 72, and the first end 43A thereof is press-fitted into and fixed to the fourth supporting part 74. When the shaft 43 is press-fitted into the fourth supporting part 74 and the second supporting part 72, an attachment base may be used. For example, the attachment base engages with the fourth supporting part 74 and the second supporting part 72, thereby fixing the positions of the fourth supporting part 74 and the second supporting part 72.

In the drive disk 4 according to the present embodiment, the main part of the base 20, which rotatably supports the drive rollers 21, can be formed by the first sheet metal member 47 and the second sheet metal member 48, so that the drive disk 4 can be manufactured easily. Each first arm part 52 and each second arm part 62 support the first end 43A of one of two adjacent drive rollers 21 and the second end 43B of the other of the two adjacent drive rollers 21. Accordingly, the drive rollers 21 can be arranged with great spatial efficiency. More specifically, a plurality of first arm parts 52 and a plurality of second arm parts 62 are alternately arranged in the circumferential direction of the drive disk 4, one first arm part 52 includes the first supporting part 71 and the second supporting part 72, and one second arm part 62 includes the third supporting part 73 and the fourth supporting part 74. Accordingly, the drive rollers 21 can be arranged with great spatial efficiency.

The first arm tip end 54 is provided with the first bent part 54E, and the axes of the first supporting part 71 and the second supporting part 72 are inclined to each other. Further, the second arm tip end 67 is provided with the second bent part 67E, and the axes of the third supporting part 73 and the fourth supporting part 74 are inclined to each other. Accordingly, the drive rollers 21 adjacent to each other have axes whose extending directions are different from each other, which makes it possible to arrange the drive rollers 21 in rotationally symmetrical positions.

The shaft 43 is press-fitted into the first to fourth supporting parts 71 to 74, and thus each first arm part 52 and each second arm part 62 are connected by the shaft 43. Accordingly, the displacement of each first arm part 52 and each second arm part 62 can be suppressed, and the rigidity of the drive disk 4 can be improved.

Concrete embodiments of the present invention have been described in the foregoing, but the present invention should not be limited by the foregoing embodiments and various modifications and alterations are possible within the scope of the present invention. For example, the first to fourth supporting parts 71 to 74 may consist of grooves opening toward the first direction, instead of through holes. In this case, the shaft 43 can be inserted into the first to fourth supporting parts 71 to 74 from the direction toward which the grooves open, so that the attachment operation of each drive roller 21 becomes easy.

In the above embodiment, each drive roller 21 includes the shaft 43 and the roller body 44 which is rotatable with respect to the shaft 43. In other embodiments, each drive roller 21 may include the shaft 43 and the roller body 44 which is not rotatable with respect to the shaft 43. For example, the shaft 43 may be press-fitted into the roller body 44, and the shaft 43 and the roller body 44 may be joined and integrated. In this case, the first end 43A of the shaft 43 may be rotatably supported by the first supporting part 71 or the fourth supporting part 74, and the second end 43B thereof may be rotatably supported by the third supporting part 73 or the second supporting part 72.

When placing the drive roller 21 in the first roller receiving part 69A, the operator places the roller body 44 in the first roller receiving part 69A such that the roller body 44 is coaxial with the first supporting part 71 and the third supporting part 73. Then, the operator inserts the shaft 43 into the first supporting part 71, the roller body 44, and the third supporting part 73 in this order. At this time, the central part of the shaft 43 is press-fitted into and fixed to the roller body 44. The roller body 44 cannot pass through the first supporting part 71 and the third supporting part 73, and thus the position of the drive roller 21 with respect to the first arm tip end 54 and the second arm tip end 67 is fixed in the axial direction of the shaft 43. The shaft 43 is rotatably supported by the first supporting part 71 and the third supporting part 73, so that the drive roller 21 can rotate. As a method of placing the drive roller 21 in the second roller receiving part 69B, a method for placing the drive roller 21 in the first roller receiving part 69A may be used.

The invention claimed is:

1. Drive disks arranged on either side of an annular main wheel and configured to rotate the main wheel around a central axis and an annular axis by applying a frictional force to the main wheel, each of the drive disks comprising:
   a disk-shaped base rotatably supported by a frame; and
   a plurality of rollers rotatably supported by an outer circumferential part of the base, inclined to each other, and coming into contact with the main wheel,
   wherein the base includes a first sheet metal member and a second sheet metal member,
   the first sheet metal member includes a first central part and a plurality of first arm parts extending radially outward from the first central part,
   the second sheet metal member includes a second central part and a plurality of second arm parts extending radially outward from the second central part,
   the first central part and the second central part are arranged coaxially with each other,
   each of the rollers has a first end and a second end in a rotational axis direction thereof,
   each of the first arm parts includes a first supporting part and a second supporting part arranged inside of the first supporting part in a radial direction of the base,
   each of the second arm parts includes a third supporting part and a fourth supporting part arranged outside of the third supporting part in the radial direction of the base,
   the first end of one of two rollers adjacent to each other is supported by the first supporting part and the second end thereof is supported by the third supporting part,
   the first end of the other of the two rollers adjacent to each other is supported by the fourth supporting part and the second end thereof is supported by the second supporting part,
   the first supporting part and the second supporting part are inclined to each other with a first bent part therebetween, and
   the third supporting part and the fourth supporting part are inclined to each other with a second bent part therebetween.

2. The drive disks according to claim 1, wherein the first supporting part and the third supporting part are arranged parallel to each other, and
   the second supporting part and the fourth supporting part are arranged parallel to each other.

3. The drive disks according to claim 2, wherein in circumferential directions of the first sheet metal member and the second sheet metal member, a tip end of each of the second arm parts is arranged between tip ends of two first arm parts adjacent to each other.

4. The drive disks according to claim 3, wherein the tip end of each of the first arm parts and the tip end of each of the second arm parts are arranged on one virtual plane perpendicular to a rotational axis of the base.

5. The drive disks according to claim 4, wherein the tip end of each of the first arm parts extends outward in a radial direction of the base, and
   the tip end of each of the second arm parts extends inward in the radial direction of the base.

* * * * *